United States Patent [19]
Jacquault et al.

[11] Patent Number: 6,120,741
[45] Date of Patent: Sep. 19, 2000

[54] DEVICE USING MICROWAVES TO CARRY OUT CHEMICAL REACTIONS ON A LARGE QUANTITY OF PRODUCT

[75] Inventors: Patrick Jacquault, Sèvres; Eric Koutchenkoff, Oizon; Jean-Lois Di Martino, Briare, all of France

[73] Assignee: Societe Prolabo, Fontenay-sous-Bois, France

[21] Appl. No.: 09/147,567

[22] PCT Filed: Jul. 21, 1997

[86] PCT No.: PCT/FR97/01348

§ 371 Date: Feb. 3, 1999

§ 102(e) Date: Feb. 3, 1999

[87] PCT Pub. No.: WO98/04102

PCT Pub. Date: Jan. 29, 1998

[30] Foreign Application Priority Data

Jul. 23, 1996 [FR] France .................................. 96 09207

[51] Int. Cl.[7] ...................................... H05B 6/68
[52] U.S. Cl. ........................... 422/199; 129/186; 129/21; 129/198
[58] Field of Search ............................. 422/21, 129, 186, 422/186.04, 186.29, 906, 82.12, 242, 208, 199, 118, 117, 119; 49/13

[56] References Cited

U.S. PATENT DOCUMENTS

| | | | |
|---|---|---|---|
| 3,153,580 | 10/1964 | Mihram et al. | 422/208 |
| 4,062,314 | 12/1977 | Allen et al. | 49/13 |
| 4,286,134 | 8/1981 | Nakata et al. | 219/687 |
| 5,122,633 | 6/1992 | Moshammer et al. | 219/687 |
| 5,270,515 | 12/1993 | Long | 219/687 |
| 5,286,457 | 2/1994 | Woodson et al. | 422/135 |
| 5,582,799 | 12/1996 | Amorese et al. | 422/118 |
| 5,659,874 | 8/1997 | Rault et al. | 422/186 |
| 5,725,835 | 3/1998 | Lautenschlager | 422/129 |

FOREIGN PATENT DOCUMENTS

| | | | |
|---|---|---|---|
| 0 549 495 | 6/1993 | European Pat. Off. | G01J 5/04 |
| 43 19 498 A1 | 11/1994 | Germany | B01D 1/00 |
| 02198626 | 7/1990 | Japan . | |
| WO 95 13133A | 5/1995 | WIPO | B01J 29/12 |
| WO 95/15671 | 6/1995 | WIPO | H05B 6/68 |

OTHER PUBLICATIONS

Patent Abstract of Japan, vol. 014, No. 480 (C–0771), Oct. 19, 1990.

Primary Examiner—Marian C. Knode
Assistant Examiner—Susan Ohorodnik
Attorney, Agent, or Firm—Jacobson, Price, Holman & Stern, PLLC

[57] ABSTRACT

A device for carrying out large-scale chemical reactions includes a microwave generator, a microwave application vessel containing a high-capacity reactor, and a cover, in which the vessel is a cylinder having longitudinal axis X, a microwave inlet in the vessel bottom wall, and an open upper end, in which the generator provides single-mode microwaves along axis X in the vessel, the size of the vessel being made to match the wavelength of the resonant mode of the microwaves along axis X, and in which the cover seals the upper opening of the vessel, and the cover has a conduit that connects the inside of the vessel to the environment so that the vessel is under atmospheric pressure.

25 Claims, 7 Drawing Sheets

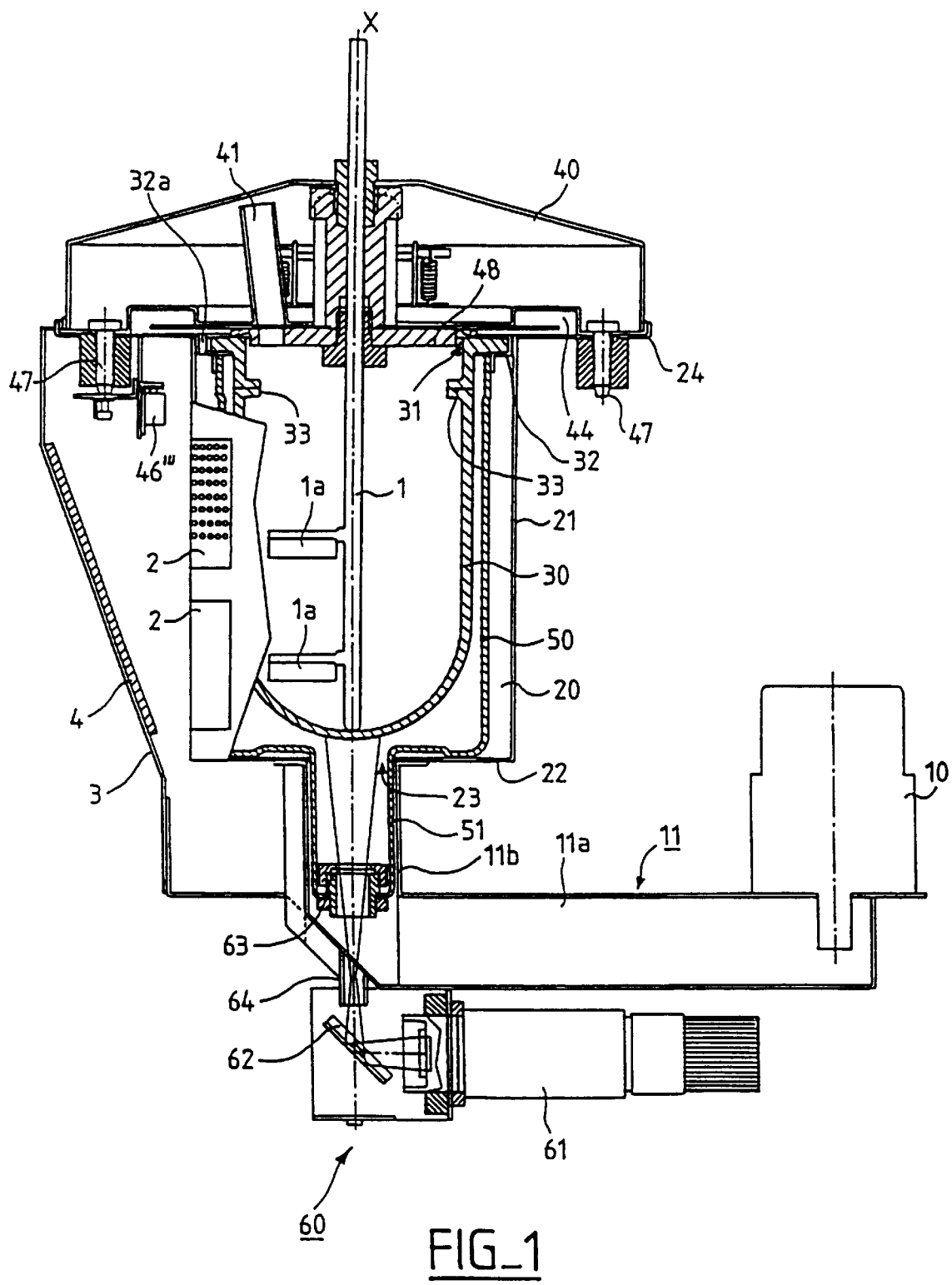
FIG_1

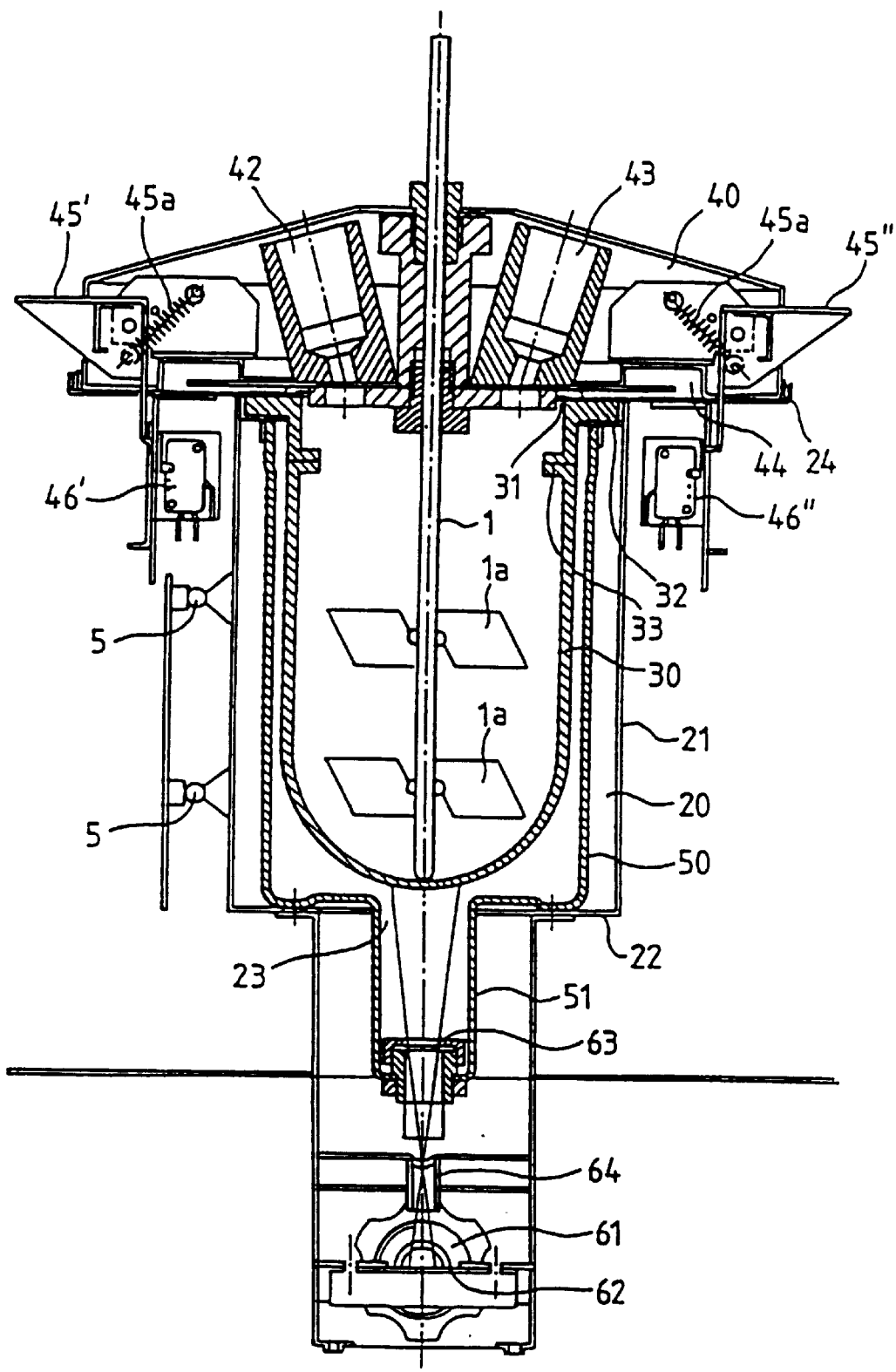
FIG_2

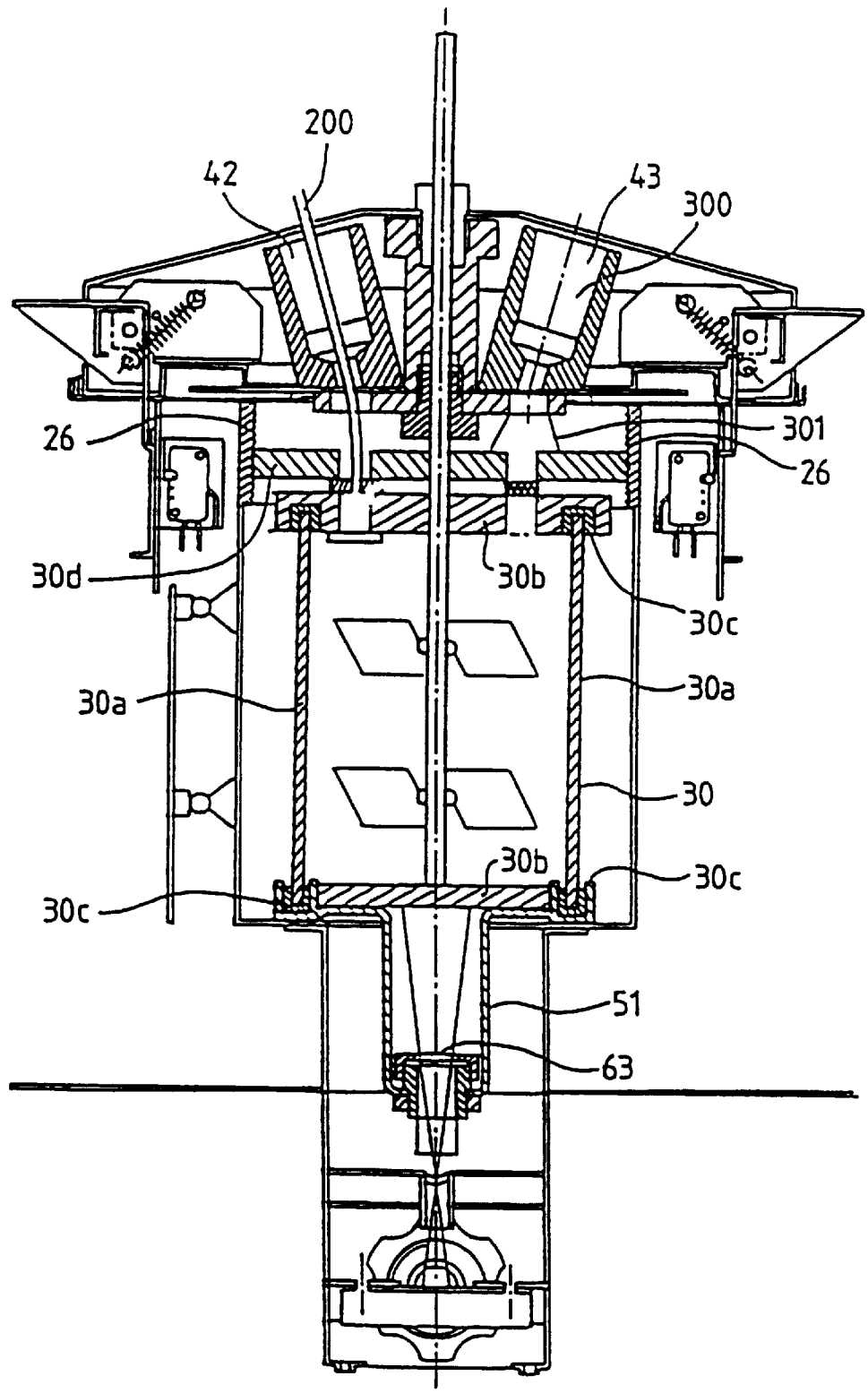
FIG_3

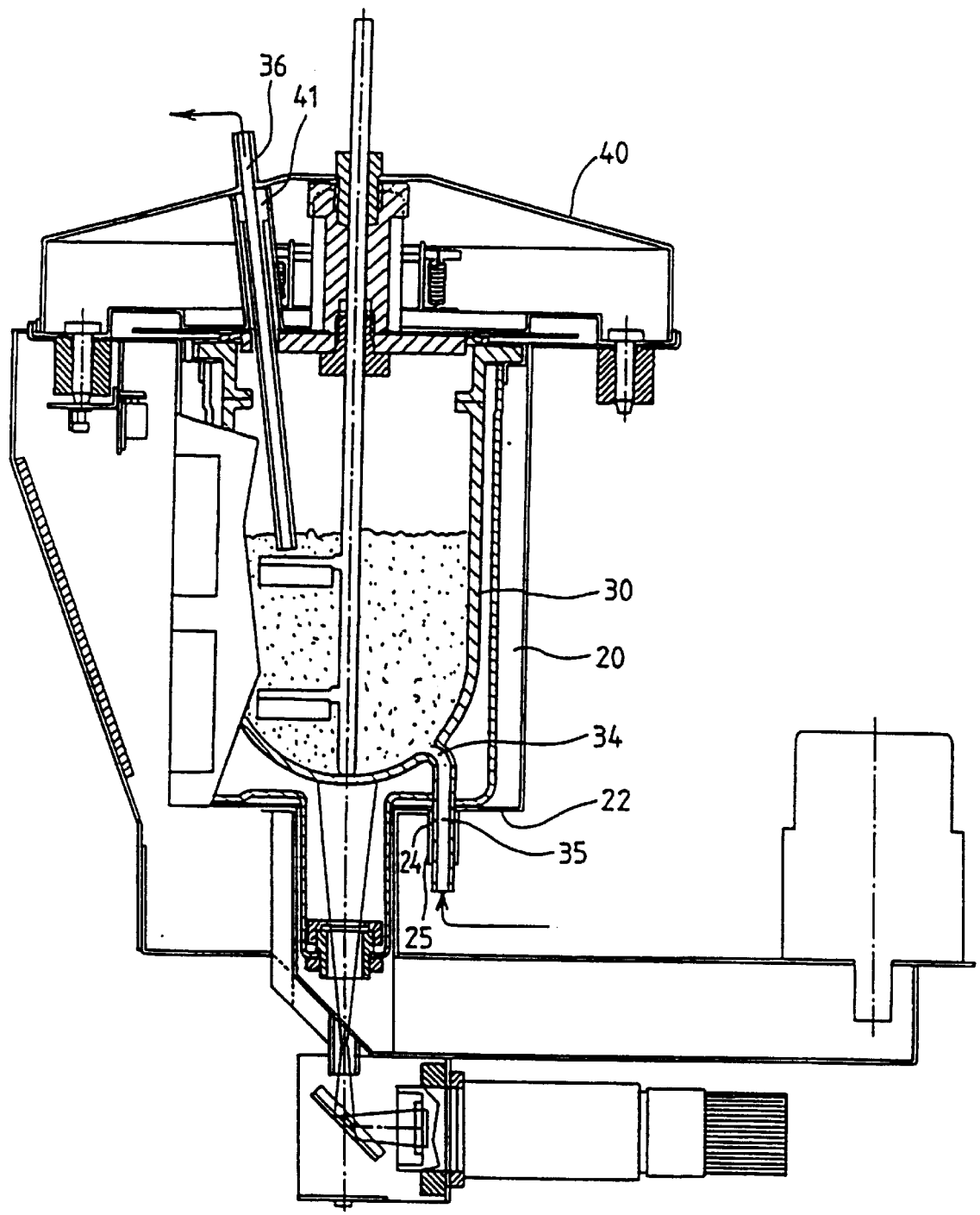
FIG_4

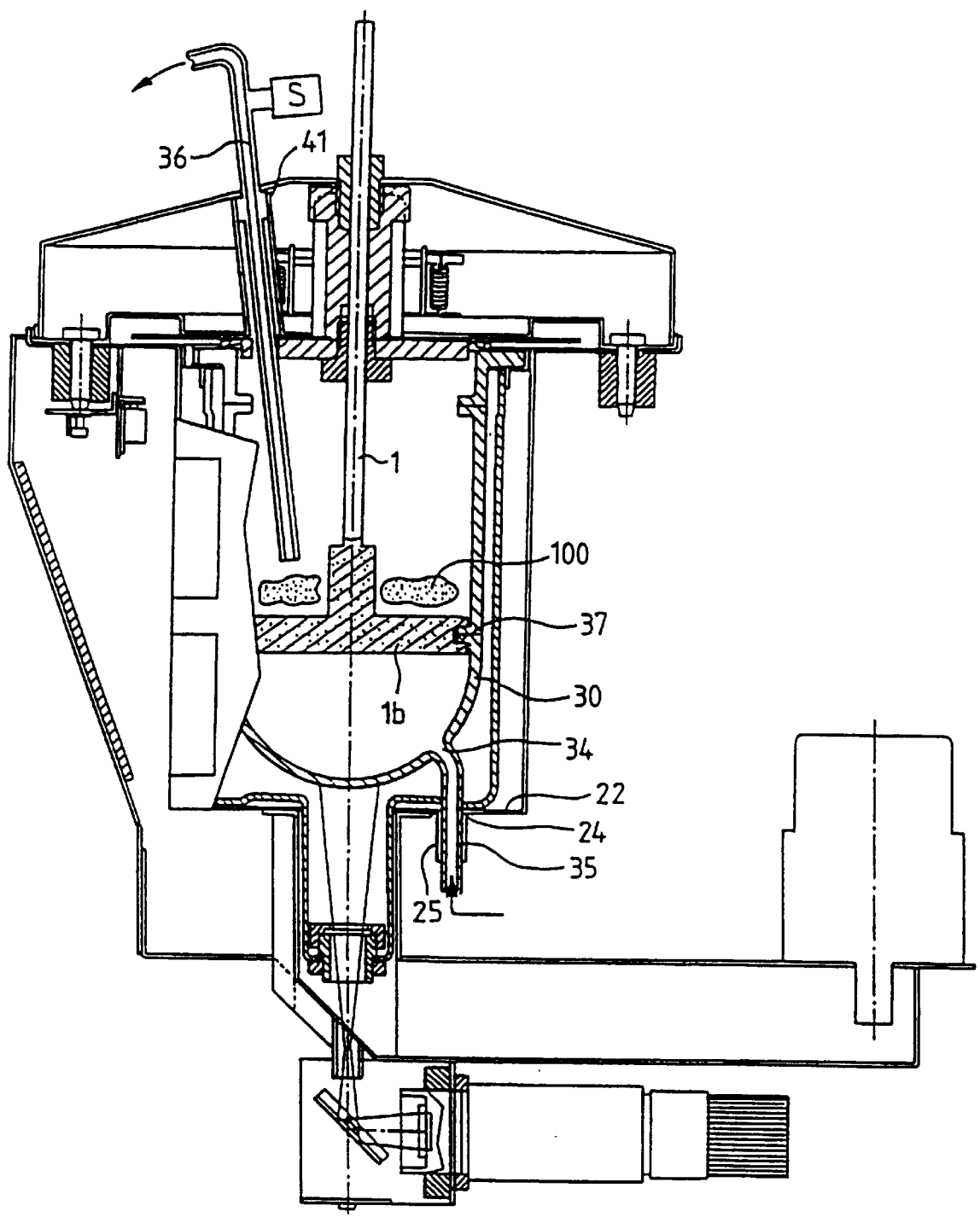
FIG_5

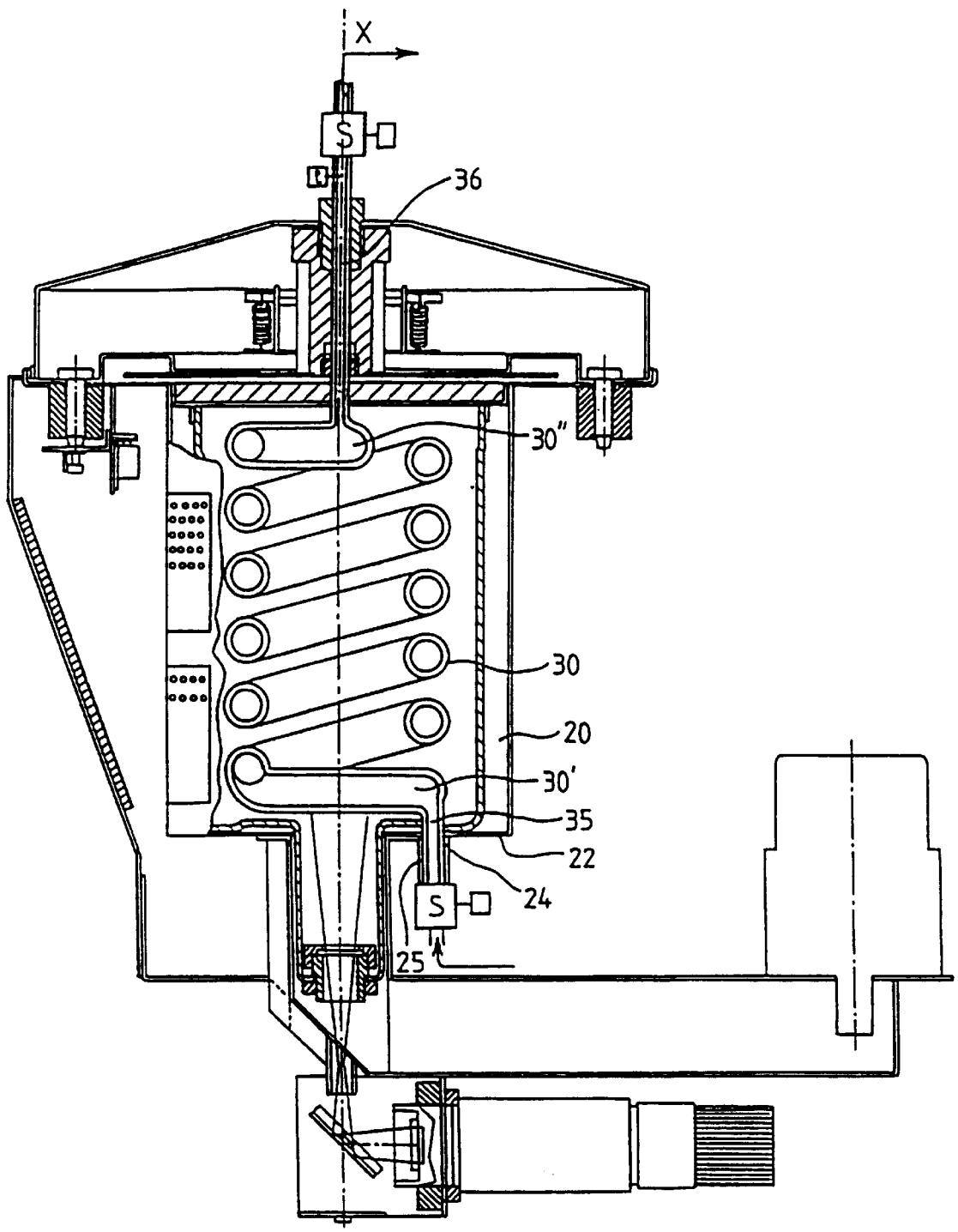
FIG_6

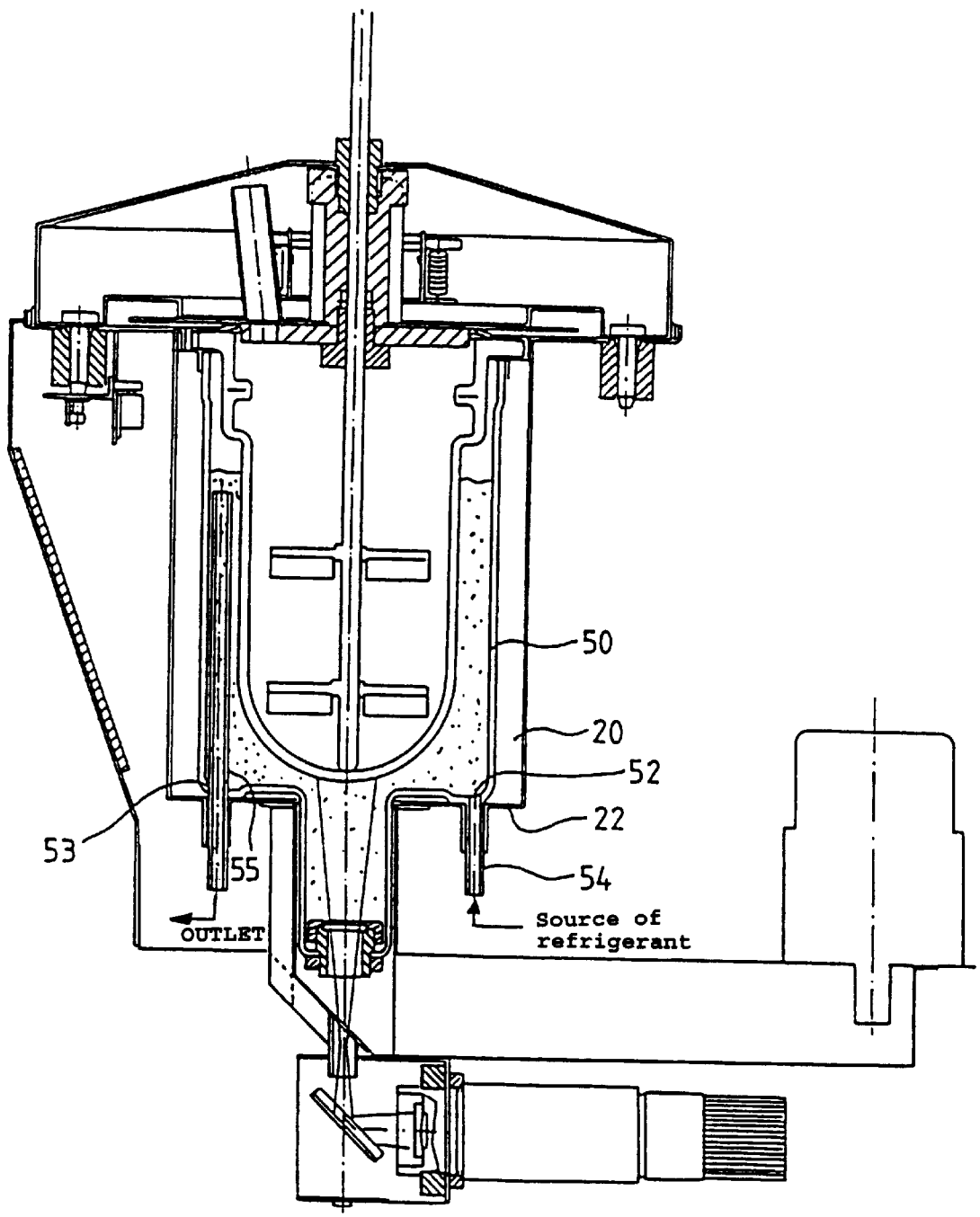
FIG_7

DEVICE USING MICROWAVES TO CARRY OUT CHEMICAL REACTIONS ON A LARGE QUANTITY OF PRODUCT

The present invention relates to a device using microwave heating to carry out chemical or physico-chemical reactions on a large nominal quantity of product.

More particularly, it relates to a device comprising a microwave generator and a microwave application cavity intended to contain a reactor of large containment volume, made of a microwave-transparent material, capable of containing the quantity of product to be treated.

The expression "large nominal quantity of product" should be understood here to mean a quantity of approximately 1 liter treated at each heating cycle.

One particularly advantageous application of the invention is for carrying out organic synthesis reactions continuously or otherwise. The invention may advantageously also be used to carry out other chemical or physico-chemical reactions in a homogenous or heterogeneous medium, such as, for example, extraction digestion reactions, polymerization reactions, distillation reactions or drying reactions.

For many years now, microwave energy has been injected into laboratory apparatus in order to carry out analytical chemistry and organic synthesis reactions. For this purpose, document EP-0,155,893, belonging to the Applicant, discloses an apparatus for conducting chemical reactions using a wet route, which comprises a microwave generator, a microwave application cavity intended to contain a container of the test-tube type containing a specimen of product to be treated and at least one specific reactant of this product, the said container being made of transparent material, transmitting the microwaves.

Such an apparatus allows only chemical reactions to be carried out in a very small volume since the container, of the test-tube type, contains a few milliliters of specimen.

Modifying this apparatus in order to treat a large nominal quantity of product and/or of reactant is not a priori obvious since it requires modifying both the shape and size of the microwave application cavity so that it can house a large-volume reactor intended to contain the large quantity of product, while at the same time taking into account certain essential technical constraints like the homogenous distribution of the microwave field inside the application cavity, the homogeneity of the temperature for the heating of the product contained in the reactor, the stirring of the product contained in the reactor, as well as the safety constraint pertaining to the use of the apparatus which includes sealing the application cavity thus preventing microwaves from propagating to the outside, while at the same time complying with the constraint that the apparatus be of small overall size.

Furthermore, the apparatus described in document EP-0,155,893 does not allow continuous operation.

Moreover, document FR-2,697,448 teaches a device for conducting chemical operations, consisting of a microwave oven closed by a front door, bounded within which oven is a working enclosure in which a reactor of large containment volume is positioned. This reactor includes at least one neck which passes through the upper wall of the oven in order to be connected to the outside. This microwave oven is provided with a magnetron capable of generating a multimode field inside the working enclosure.

The main drawback of this device is that it is not possible to control the distribution of the multimode microwave field inside the working enclosure. Consequently, the product contained in the reactor may have an undesirable temperature gradient and the chemical reactions conducted inside the said working enclosure may not be very reproducible.

Furthermore, such a device cannot operate continuously. It simply operates intermittently.

The present invention provides a novel device for carrying out chemical or physico-chemical reactions on a large nominal quantity of product, of the type comprising a microwave generator and a microwave application cavity intended to contain a reactor of large containment volume, made of microwave-transparent material, capable of containing the quantity of product to be treated, which makes it possible to carry out the said chemical or physico-chemical reactions in a reproducible manner at atmospheric pressure, or else at a higher or lower pressure, while operating intermittently or continuously.

More particularly in the device according to the present invention, the application cavity is bounded by a closed side wall which is approximately a cylinder of revolution about an axis X as well as by a bottom wall provided with an entry port for the microwaves to enter the cavity, and is open at the top for fitting and removing the reactor, the microwave generator is capable of generating a single-mode microwave field which propagates via the said entry port along the X axis in the application cavity, the dimensions of the latter being chosen depending on the wavelength of the resonant mode of the microwave field in the application cavity along the X axis so that the value of this microwave field is predetermined at all levels along the X axis in the application cavity, and a cover is provided which is intended to close the upper opening of the application cavity in a sealed manner, preventing propagation of the microwaves to the outside, and including at least one conduit which allows the inside of the application cavity to be connected to the outside so that the inside of the application cavity is subjected to atmospheric pressure.

Thus, according to the invention, the combination of the application cavity, having a particular shape as defined above, with a single-mode microwave field generator makes it possible for the distribution of the microwave field generated inside the application cavity to be controlled and hence for the chemical or physico-chemical reactions conducted inside the said application cavity to be reproducible.

According to the invention, the cover closing the application cavity seals the device, preventing propagation of microwaves to the outside, while still allowing the overall size of the device to be small.

The application cavity of the device according to the invention is subjected to atmospheric pressure by being connected to the outside via a conduit provided in the cover.

However, it is advantageously possible to carry out chemical reactions at an increased pressure or at a reduced pressure in this application cavity by introducing, into said application cavity, a closed reactor that operates at an increased pressure or at a reduced pressure.

Advantageously, according to the invention the application cavity has, between the microwave entry port and its upper opening, a height corresponding to three half-wavelengths of the resonant mode of the microwave field in said cavity.

According to one particularly advantageous embodiment of the device according to the present invention, for the purpose of continuous operation, the reactor includes, in its bottom, an opening which runs into a pipe which is intended to be inserted into an orifice provided in the bottom wall of the application cavity and which emerges on the outside of said application cavity in order for it to be connected to a pump for supplying product and/or reactant, said orifice provided in the bottom wall of the application cavity being bordered externally by a duct forming a barrier to propagation of the microwaves to the outside, and one of the conduits in the cover provided for connecting the application cavity to the outside makes it possible to connect, at the top, the inside of the reactor via an outlet pipe to a pump for removing the treated product.

Thus, with the aid of the device according to the invention it is possible, using microwave energy, to treat a large quantity of product continuously, thereby making a real saving in the time required for carrying out the chemical reactions conducted.

The following description, with regard to the appended drawings, given by way of nonlimiting examples, will make the composition of the invention and how it may be realized clearly understood.

BRIEF DESCRIPTION OF THE DRAWINGS

In the appended drawings:

FIG. 1 is a schematic sectional view of a first embodiment of the device for carrying out chemical reactions according to the present invention;

FIG. 2 is a schematic sectional view in a plane perpendicular to the plane of section of FIG. 1 of the device shown in FIG. 1;

FIG. 3 is a schematic sectional view of a second embodiment of the device according to the present invention;

FIG. 4 is a schematic sectional view of a third embodiment of the device according to the invention;

FIG. 5 is a schematic sectional view of a fourth embodiment of the device according to the present invention;

FIG. 6 is a schematic sectional view of a fifth embodiment of the device according to the present invention; and FIG. 7 is a schematic sectional view of a sixth embodiment of the device according to the present invention.

As a preliminary, it will be noted that, from one figure to another, identical or similar elements have been as far as possible denoted by the same reference symbols and will not be described again each time.

FIGS. 1 and 2 show a first embodiment of a device for carrying out chemical or physico-chemical reactions on a large nominal quantity of product.

According to the embodiment shown, the device is designed to operate intermittently with a defined quantity of product to be treated.

This device comprises a microwave generator 10, a microwave application cavity 20 intended to contain a reactor 30 of large containment volume, made of microwave-transparent material, capable of containing the quantity of product to be treated.

The microwave application cavity 20 is bounded by a closed side wall 21 which is approximately a cylinder of revolution about an axis X, here a vertical axis, forming the main axis of the device, as well as by a bottom wall 22 extending transversely to the axis X and provided with an entry port 23 for the microwaves to enter the application cavity 20. This application cavity 20 is open at the top by a circular opening whose dimensions are such that it allows the reactor 30 to be inserted into said application cavity as well as removed from the cavity.

The microwave generator 10 is capable of generating a single-mode microwave field which propagates inside a right-angled waveguide 11 which runs via the entry port 23 into the cavity.

More particularly, the right-angled waveguide 11 has a horizontal first part 11a at the end of which is placed the magnetron 10 forming the microwave generator. This horizontal portion 11a is joined by a right-angled piece to a vertical connection part 11b extending along the X axis of the application cavity 20 and emerging, at its end, in the application cavity 20 via the entry port 23. At the junction between the horizontal part 11a and the vertical part 11b of the waveguide 11, the external wall of the waveguide follows a cut corner.

Of course, according to an alternative embodiment, not shown, a straight waveguide placed directly on the axis of the application cavity may be provided.

A reactor 30, having a side wall which is approximately a cylinder of revolution about the X axis and is joined in a continuous manner to a rounded closed bottom, is positioned inside the application cavity 20. The reactor 30 has an upper opening 31, the size of which corresponds approximately to that of the upper opening of the application cavity. The reactor 30 has a product and/or reactant containment volume of approximately 1 liter and preferably here of 800 milliliters.

The reactor 30 is placed inside a well 50 which is positioned in the application cavity between the side wall 21 of the application cavity 20 and the side wall of the reactor 30, this having a shape similar to that of the application cavity 20 and also an upper opening for fitting and extracting the reactor. The upper opening of the application cavity is bordered internally by a peripheral flange on which a peripheral edge 32 surrounding the upper opening 31 of the reactor 30 rests so that the reactor 30 is suspended inside the application cavity and is surrounded by the well 50.

An antirotation pin 32a is provided on the internal peripheral flange of the application cavity, this pin being intended to engage in a corresponding recess in the peripheral edge 32 of the reactor in order to prevent any rotation of the reactor about the X axis in the application cavity.

Furthermore, the well 50 has a bottom placed on the bottom wall 22 of the application cavity and the central part 51 of the well extends inside the vertical connection part 11b of the waveguide 11.

This well 50 protects the application cavity 20, as well as the waveguide 11, upon a possible rupture of the reactor under microwave heating.

It will be noted that the reactor 30 has projections 33 which are located just below its upper opening 31 and extend into the interior of the reactor 30 by projecting transversely from the plane of the side wall of said reactor. These projections 33 allow the reactor 30 to be extracted from the application cavity 20.

The microwave application cavity 20 is made of stainless steel and its dimensions are chosen depending on the wavelength of the resonant mode of the microwave field along the X axis in the application cavity, so that the value of this microwave field is predetermined at all levels along the X axis in the application cavity and more particularly in all planes transverse to the X axis.

This is particularly advantageous in order to ensure that the chemical or physico-chemical reactions carried out inside the application cavity are conducted properly and are reproducible. Thus, the temperature of the product to be heated contained in the reactor is homogenous.

More particularly, the dimensions of the application cavity 20 have preferably been determined so that the resonant frequency of the microwave field inside said cavity, at the $TE_{113}$ fundamental mode, is 2.45 GHz. Thus, the diameter of said application cavity is approximately 154 millimeters and its height is approximately 206 millimeters. The height of said application cavity, lying between the microwave entry port 23 and its circular opening is determined so that it corresponds to three half-wavelengths of the resonant mode of the microwave field in said cavity.

Experimentally, a zero microwave field is then obtained at the entry port 23 of said application cavity with quite a small angle effect of the right-angled part of the waveguide. This is due to the fact that the standing wave inside the waveguide 11 does not have a maximum amplitude at the right-angle of the right-angled part but just after it. Moreover, three maximum values of the microwave field at the $TE_{113}$ fundamental mode are obtained in the active height of the application cavity.

In order to prevent propagation of the microwave field generated inside the application cavity 20 to the outside, a cover 40 is provided, as shown in FIGS. 1 and 2, which is intended to close the upper opening of the application cavity 20 in a sealed manner so as to prevent propagation of the microwaves to the outside.

This cover 40 will be placed on a flange 24 provided on the outside around the upper opening of the application cavity. The cover 40 is positioned with the aid of centring projections 47 inserted into holes formed in the flange 24 for supporting the application cavity 20.

The cover 40 is provided on its internal face turned towards the inside of the application cavity with a quarter-wave trap 44, thus preventing propagation of the microwaves generated in the application cavity to the outside via the cover.

Furthermore, it has, on this internal face, beneath the quarter-wave trap in a central region centred about the X axis, a seal 48 covering the surface of the upper opening 31 of the reactor 30.

The cover 40 has three conduits 41, 42, 43 which connect the inside of the application cavity 20 and, according to the embodiment shown in FIGS. 1 and 2, the inside of the reactor 30 to the outside of the device in such a way that, according to the embodiment shown in FIGS. 1 and 2, the application cavity 20 and the inside of the reactor 30 are subjected to atmospheric pressure. The two conduits 42, 43 are placed symmetrically on each side of the X axis.

The seal 48 has three openings allowing the inside of the reactor 30 to be connected to the conduits 41, 42, 43 of the cover 40 which open to the outside.

The conduits 41, 42, 43 provided in the cover and connecting the inside of the application cavity 20 and, here, the inside of the reactor 30 to the outside, make it possible in particular to remove specimens of product during the chemical reaction, to inject products and/or reactants, and to extract any vapour generated by the chemical reaction. More particularly, the conduit 41 may be designed to allow specimens to be removed and/or auxiliary measurements to be made, and the conduit 42 may be designed to allow vapour extraction. This conduit 42 is then connected to an external suction system, not shown, comprising a refrigerant allowing the vapour generated during the chemical reaction to recondense. Such a system may allow the device to operate in a reflux mode or in distillation mode.

The conduit 43 itself may be more particularly linked to a device for injecting products and/or reactants during the chemical reaction.

Furthermore, the cover 40 is locked onto the application cavity 20 by means of at least two locking levers 45', 45" actuated on the cover 40 by means of four return springs 45a so that they can adopt two positions—an open position and a locked position which is shown more particularly in FIG. 2, in which the locking levers 45', 45" are locked onto an external support part linked to the application cavity 20.

In the locked position, the two locking levers 45', 45" make contact with two switches 46', 46" which then emit a safety signal. The two switches 46', 46" are connected to a third safety switch 46''', shown more particularly in FIG. 1, which makes it possible to check that proper contact has been made with the first and second switches 46', 46".

Furthermore, as may be seen in FIGS. 1 and 2, a stirrer is provided which comprises a rotating drive shaft 1 extending along the X axis and carrying at its lower end stirring blades 1a intended to be immersed in the product contained in the reactor. The rotating drive shaft 1 emerges outside the application cavity by passing in a sealed manner through the cover 40. This stirrer allows some homogenisation of the product to be treated during the chemical reaction.

The application cavity 20 advantageously has, on the outside of its side wall 21, grilles 2 for viewing the inside of the application cavity. For this purpose, it will be noted that a transparent window 4, positioned opposite the viewing grilles 2, is provided in the casing 3 of the device inside which the application cavity 20 is positioned. Furthermore, as shown more particularly in FIG. 2, lighting lamps 5 are advantageously provided, making it easier to see into the application cavity via the transparent window in the casing and the viewing grilles provided on the external face of the application cavity.

The device shown in FIGS. 1 and 2 includes a device 60 for measuring the temperature of the product to be treated during the chemical or physico-chemical reaction carried out, this device being placed beneath the application cavity on the X axis. This device 60 for measuring the temperature has an infrared sensor 61 capable of detecting, directly or indirectly, infrared radiation emitted on the X axis by the product heated in the reactor. According to the embodiment shown in the figures, this infrared sensor 61 is positioned beneath the application cavity and more particularly beneath the waveguide 11 so as to be offset with respect to the X axis of the application cavity. It is positioned opposite a sighting mirror 62 made of stainless steel, placed on the X axis and oriented at 45 degree [sic] with respect to said X axis.

Provided in the cut corner of the waveguide is a sighting hole or opening bordered by a duct 64 forming a barrier to the propagation of microwaves to the outside. This sighting hole is placed on the X axis opposite the sighting mirror 62. Furthermore, a sighting window 63 is provided, positioned in the central part of the bottom of the well 51 which goes into the vertical connection part 11a of the waveguide. This sighting window 63 extends transversely to the X axis opposite the sighting hole provided in the cut-corner wall of the waveguide.

Thus, the infrared radiation emitted by the microwave-heated product then passes through the sighting window 63 and the sighting hole made in the cut-corner wall of the waveguide in order to reach the sighting mirror 62 which reflects the emitted radiation towards the infrared sensor 61. The infrared sensor 61 may be connected to a feedback system for controlling the chemical reaction as a function of the measured temperature of the product contained in the reactor.

Of course, provision may be made for the infrared sensor to be placed on the X axis and then to receive the radiation emitted by the heated product directly.

Furthermore, according to another embodiment (not shown), provision may be made for the device for measuring the temperature of the product contained in the reactor to be placed on a lateral side of the application cavity. The said measurement device then comprises an infrared sensor capable of detecting, via an orifice provided in the side wall of said application cavity, infrared radiation emitted along an axis transverse to the X axis by the product heated in the reactor.

FIG. 3 shows a second embodiment of the device according to the present invention. The device here is designed so as to operate at an increased pressure or at a reduced pressure. It then has a closed reactor positioned inside the application cavity which is open to the outside via the conduit 41 provided in the cover 40. This closed reactor 30 is produced by joining glass side walls 30a to a bottom wall 30b and a top wall 30b. The bottom wall and the top wall 30b of the reactor 30 are joined to the lower and upper edges of the side walls 30a via seals 30c. Thus, a closed internal space, sealed from the outside, is defined inside the reactor 30. The top wall 30b of the reactor 30 is linked to and held under pressure by a holding plate 30d which extends transversely over the entire width of the application cavity 20 and which has an edge screwed into a thread 26 provided on the internal face of the side wall 21 of the application cavity 20 just below its upper opening.

Thus, the closed reactor 30 may operate at an increased pressure or at a reduced pressure with respect to the atmospheric pressure existing inside the application cavity 20. For this purpose, according to the embodiment shown in FIG. 3, a pressure sensor 200 is provided which is inserted into the core of the reactor 30 via the conduit 42 of the cover 40, then via an orifice provided in the holding plate 30d and finally via an orifice provided in the top plate 30b of the reactor. This pressure sensor makes it possible to measure the pressure or the vacuum existing inside the reactor 30. Furthermore, in the event of the reactor rupturing, a suction device 300 together with a suction nozzle 301 positioned in the application cavity 20, at the outlet of the conduit 43 provided in the cover 40, is provided. This suction nozzle emerges via an orifice provided in the holding plate 30d on the top wall 30b of the reactor 30 by means of a safety disk.

The suction device 300 is connected to the suction nozzle 301 by means of the conduit 43. In the event of the reactor rupturing, the safety disk breaks and the suction nozzle linked to the suction device operates in order to suck out the debris of the reactor.

According to the embodiment shown in FIG. 3, that part 50 of the well which lies inside the application cavity 20 no longer exists, only the part 51 of the well extending inside the Waveguide 11 is retained, together with the sighting window 63 for measuring the temperature, as was described previously.

FIG. 4 shows a third embodiment of the device according to the invention, for the purpose of operating the device continuously. The arrangement of the device shown in FIG. 4 allows the chemical reactions, such as organic synthesis reactions, to be conducted continuously.

According to this embodiment, the reactor 30, of similar shape to that of the reactor shown in FIGS. 1 and 2, has, in its bottom, an opening 34 connected to a pipe 35 intended to pass through the well 50 and an orifice 24 provided in the bottom wall 22 of the application cavity 20 in order to emerge on the outside of the application cavity and to be connected to a pump (not shown) for supplying products and/or reactants. The orifice 24 provided in the bottom wall 22 of the application cavity 20 is bordered on the outside by a duct 25 forming a barrier preventing propagation of the microwaves generated in the application cavity to the outside. Provided at the top of the reactor 30 is a pipe 36 immersed in the reactor 30, and more particularly in the product to be treated, and passing through the cover 40 via the conduit 41 so as to be able to be connected outside the application cavity to a pump (not shown) for extracting the treated product.

It is possible to adjust the position of the pipe 36 heightwise depending on the product or on the level of the product to be treated.

FIG. 5 shows a fourth embodiment of the device according to the present invention. In this embodiment, the device is designed to carry out chemical reactions on gases continuously. There is then again the opening 34 provided in the bottom part of the reactor 30, connected to the pipe 34 passing through the well and the application cavity via the orifice 24 provided in the bottom wall 22 of the application cavity and bordered by the duct 25, in order to be connected to a supply of gaseous product and/or reactant. In addition, a pipe 36 is also provided which is immersed in the reactor 30 and emerges outside the application cavity via the conduit 41 provided in the cover 40 closing the upper opening of the application cavity, in order for it to be connected to a fines filtration and storage system.

According to the embodiment shown in FIG. 5, the shaft 1 of the stirrer is used here as a support shaft bearing, at its lower end immersed in the reactor, a sintered support 1b extending transversely to the X axis and blocked on internal studs 37 of the reactor 30. The sintered support 1b separates the inside of the reactor into two chambers—a lower chamber communicating with the orifice 34 connected to the outside by the pipe 35 and an upper reaction chamber communicating with the pipe 36.

The reactant or catalyst 100 is in the form of a gas in the upper reaction chamber of the reactor, the gaseous product entering via the pipe 35 in the lower chamber. After having passed through the sintered support 1b, the treated gases are removed via the pipe 36 to a fines filtration and storage system. In the case of the device operating at an increased pressure, it may be seen that a safety valve S is provided near the outlet of the pipe 36.

FIG. 6 shows another embodiment for operating the device according to the present invention continuously. According to the embodiment in FIG. 6, the reactor 30 of said device is in the form of a tube following a zigzag path inside the application cavity between the bottom wall of the application cavity and its upper opening. The reactor 30 has, in the lower part, in the bottom of the application cavity, a tube portion 30' which is transverse to the X axis of the application cavity and is connected by the vertical pipe 35 to the outside of the application cavity via the orifice 24 provided in the bottom wall 22 of the application cavity 20. Product and/or reactant are supplied by a pump (not shown here) through this pipe 35. The mixed product and reactant travel along the zigzag path defined by the tube-shaped reactor 30 in order to reach the level of the cover 40.

Just below the cover 40 the tube 30 has a horizontal transverse part 30" connected to a pipe 36 which passes, along the X axis, in a sealed manner through the cover 40 and is connected outside the device to a pump (not shown here). The treated product leaves via the pipe 36 and goes to a storage or recycling unit. Such a system shown in FIG. 6 may operate at atmospheric pressure or at an increased pressure. If it operates at an increased pressure, two safety valves S are provided—one valve S is positioned at the inlet of the reactor outside the application cavity 20 on the pipe 35 and one safety valve S is placed at the outlet of the reactor outside the application cavity 20 on the pipe 36.

The pressure inside the reactor 30 may be regulated and adjusted by means of these safety valves.

Of course, according to an embodiment not shown, provision may be made for the tube 30 forming the reactor to follow a straight path inside the application cavity.

FIG. 7 shows a final embodiment for the device according to the invention to operate intermittently, in which the well 50 forms a container for containing, if so required, a liquid or gaseous refrigerant allowing the product contained in the reactor to be cooled so as, optionally, to slow down or stop the chemical or physico-chemical reaction in progress and thus to prevent said reaction running away.

To do this, the well 50 has, in its bottom wall, two orifices 52, 53 positioned on each side of the central part 51 which engages in the waveguide, symmetrically with respect to the X axis. Placed in said orifices 52, 53 are pipes 54, 55, respectively. Said pipes 54, 55 pass in a sealed manner through the bottom wall 22 of the application cavity 20 in order to emerge on the outside of the latter.

A first pipe 54 has an internal end which emerges at the orifice 52 inside the well and is connected at its external end to a source of refrigerant in order to allow said well to be filled with refrigerant.

The second pipe 55 extends inside the well as far as a certain filling level and operates in the manner of a siphon in order to drain the well beyond a certain level of refrigerant. The outlet of this second pipe may optionally be connected to a pump (not shown) in order to increase the rate at which the refrigerant is removed.

The present invention is in no way limited to the embodiments described and shown, but those skilled in the art will be able to envisage any variant in accordance with the spirit of the invention.

What is claimed is:

1. Device that can carry out a chemical or physicochemical reaction on a product present in a quantity of about 1 liter, comprising
    a) a microwave generator (10) for generating single-mode microwaves having a wavelength,
    b) a reactor (30) having a containment volume, made of microwave-transparent material, for containing the product,
    c) a microwave application cavity (20) containing said reactor and
    d) a cover (40) having an outer edge,
characterized in that,
    said application cavity is bounded by (i) a closed side wall (21) approximating a cylinder of revolution about an axis X and (ii) a bottom wall (22),
    said application cavity is open at the top by an upper opening which provides for fitting and removing the reactor,
    said bottom wall has an entry port (23) for said single-mode microwaves to enter the application cavity and propagate along said axis X,
    said application cavity has dimensions which allow for predetermining the resonant frequency of the single-mode microwaves in all planes transverse to the axis X in the application cavity,
    said application cavity has, between the entry port and the upper opening, a height corresponding to three half-wavelengths of the of the single-mode microwaves in said application cavity, thereby, providing a homogeneous distribution of the microwaves in the application cavity,
    said cover closes the upper opening of the application cavity in a sealed manner, preventing propagation of the single-mode microwaves outside the application cavity, and
    said cover includes at least one conduit (41) connecting the inside of the application cavity to the outside so that the application cavity can be subjected to atmospheric pressure.

2. Device according to claim 1, characterized in that the cover (40) has, on its internal face facing the application cavity (20), a quarter-wave trap.

3. Device according to claim 1, characterized in that the cover (40) comprises, on the outer edge, at least two locking levers (45', 45") placed symmetrically with respect to the axis X for locking onto an external support linked to the application cavity.

4. Device according to claim 3, further comprising switches (46', 46", 46''') for emitting a safety signal when the locking levers (45', 45") have been locked onto said support part.

5. Device according to claim 1, characterized in that the cover (40) includes at least three conduits (41, 42, 43) connecting the inside of the application cavity (20) to the outside, two of said at least three conduits (42, 43) placed symmetrically on opposing sides of the axis X, characterized in that said at least three conduits
    allow for removing samples of the product during the chemical or physicochemical reaction on the product,
    allow for extracting vapours generated by the chemical or physicochemical reaction, and
    allow for injecting materials into the application cavity during the chemical reaction.

6. Device according to claim 1, characterized in that the microwave generator (10) is connected to the application cavity (20) by means of a waveguide (11) which includes a connection part (11b) extending along the axis X of the application cavity (20) and emerging at its end in said application cavity (20) via said entry port (23).

7. Device according to claim 1, further comprising a sensor device, for measuring the temperature of the product contained in the reactor, placed on a lateral side of the application cavity and comprising an infrared sensor for detecting via an orifice provided in the side wall of said application cavity, infrared radiation emitted along an axis transverse to the axis X by the product heated in the reactor.

8. Device according to claim 1, further comprising a sensor device (60), provided for measuring the temperature of the product contained in the reactor, placed beneath the application cavity (20) on the axis X, said sensor device comprising an infrared sensor (61) for detecting infrared radiation emitted among the axis X by the product heated in the reactor (30).

9. Device according to claim 8, characterized in that the temperature measurement is carried out through an opening made in a wall of a waveguide (11) connected to the application cavity (20), said opening being bordered externally by a duct (64) forming a microwave absorption barrier so as to prevent the microwaves from propagating to the outside.

10. Device according to claim 9, further comprising a mirror (62) placed at an angle of 45 degrees on the axis X and for transmitting the infrared radiation emitted by the product heated in the reactor (30) to the infrared sensor (61) positioned so as to be offset with respect to the axis X of the application cavity (20).

11. Device according to claim 1, further comprising a stirrer having a rotating drive shaft (1) carrying stirring blades (1a) for immersing in the product contained in the reactor, the rotating drive shaft extending along the axis X and emerging outside of the application cavity (20) by passing through the cover (40) in a sealed manner.

12. Device according to claim 1, characterized in that the reactor (30) has
 a side wall approximating a cylinder of revolution about the axis X,
 a rounded closed bottom wall joined continuously to said side wall, and
 an upper opening (31), the size of which corresponds approximately to the size of the upper opening of the application cavity (20).

13. Device according to claim 6, characterized in that the reactor is positioned in a well (50) placed in the application cavity (20), said well (50) having a bottom whose central part (51) extends inside the connection part (11b) of the waveguide (11).

14. Device according to claim 13, characterized in that a sighting window (63) for the infrared radiation for measuring the temperature is provided in the bottom of the central part of the well (50, 51).

15. Device according to claim 13, characterized in that the bottom of the well (50) has two orifices (52, 53) placed symmetrically with respect to the axis X of the application cavity (20) and positioned in each of them is a pipe (54, 55) which passes in a sealed manner through the bottom wall (22) of said application cavity (20) in order to emerge on the outside of the latter, said pipes (54, 55) allowing a refrigerant to enter and leave the well (50) around the reactor (30) so as to rapidly cool the product contained in the reactor (30), in order, optionally, to slow down or stop the chemical reaction in progress.

16. Device according to claim 1, characterized in that, for the purpose of operating continuously,
 the reactor (30) has a bottom including an opening (34) which runs into inlet pipe (35), said inlet pipe inserted into an orifice (24) provided in the bottom wall (22) of the application cavity (20) and emerging outside of said application cavity for connecting to a pump for supplying a product and/or reactant to the reactor,
 said orifice in the bottom wall of the application cavity is bordered externally by a duct (25) forming a barrier to propagation of microwaves outside of the application cavity, and
 the at least one conduit in the cover carries outlet pipe (36) connected to the reactor top, for providing connection between the reactor and a pump for removing treated product from the reactor.

17. Device according to claim 16, characterized in that, for the purpose of carrying out a chemical reaction on a gas continuously, a support shaft (1) is provided which extends along the axis X and has an end immersed in the reactor, said end carrying a sintered support (1b) which extends transversely to the axis X and separates the reactor into an upper reaction chamber and a lower chamber, said lower chamber provided for supplying gaseous products to the upper chamber and communicating via the orifice in the bottom of the reactor with the inlet pipe, said upper reaction chamber provided for reacting a reactant or catalyst (100) in the form of gas, and said upper reaction chamber communicating with the outlet pipe by which treated gases are removed.

18. Device according to claim 16, characterized in that the reactor (30) is in the form of a tube which follows either a zigzag or straight path in the application cavity (20), said tube comprising
 an upper part (36) for connection to the outside of the application cavity, said upper part passing in a sealed manner through the cover (40), and
 a lower part (35) for connecting to the outside, said lower part passing in a sealed manner through an orifice (24) provided in the bottom wall (22) of the application cavity (20) and emerging outside of the application cavity.

19. Device according to claim 16, further comprising safety valves (S) allowing the device to operate at an increased pressure, said safety valves provided outside the application cavity (20) on the inlet pipe (35) and on the outlet pipe (36).

20. Device according to claim 1, characterized in that the reactor (30) is a closed reactor for operation at an increased pressure or at a reduced pressure, said reactor comprising side walls (30a), a top wall (30b), and a bottom wall (30b) joined together so as to define a closed internal space sealed from the outside, the top wall (30b) of the reactor (30) being linked to a holding plate (30d) screwed into a thread (26) provided in the upper part on the internal face of the side wall of the application cavity.

21. Device according to claim 1, characterized in that the reactor (30) has a product and/or reactant containment volume of approximately 1 liter.

22. Device, for carrying out a chemical or physicochemical reaction on a product, comprising
 a) a microwave generator (10) for generating single-mode microwaves having a wavelength,
 b) a reactor (30) having a containment volume sufficient to contain the product, said reactor made of microwave-transparent material,
 c) a microwave application cavity (20) containing said reactor and
 d) a cover (40) having an outer edge,
characterized in that,
 said application cavity is bounded by (i) a closed side wall (21) approximating a cylinder of revolution about an axis X and (ii) a bottom wall (22),
 said application cavity is open at the top by an upper opening which provides for fitting and removing the reactor,
 said bottom wall has an entry port (23) for said single-mode microwaves to enter the application cavity and propagate along said axis X,
 said application cavity has dimensions which allow for predetermining the resonant frequency of the single-mode microwaves in all planes transverse to the axis X in the application cavity,
 said cover closes the upper opening of the application cavity in a sealed manner, preventing propagation of the single-mode microwaves outside the application cavity,
 said cover includes at least one conduit (41) connecting the inside of the application cavity to the outside so that the application cavity can be subjected to atmospheric pressure, and
 the reactor is positioned in a well (50) placed in the application cavity (20), said well (50) having a bottom whose central part (51) extends inside the connection part (11b) of the waveguide (11).

23. Device according to claim 22, characterized in that a sighting window (63) for infrared radiation for measuring the temperature is provided in the central part of the well bottom.

24. Device according to claim 22, characterized in that the well bottom has two orifices (52, 53) placed symmetrically with respect to the axis X of the application cavity (20) and positioned in each of the two orifices is a pipe (54, 55) which passes in a sealed manner through the bottom wall (22) of said application cavity (20) in order to emerge on the outside of the application cavity, said pipes (54, 55) for allowing a refrigerant to enter and leave the well (50) around the reactor (30) so as to rapidly cool the product contained in the reactor (30), in order, optionally, to slow down or stop the chemical or physicochemical reaction in progress.

25. Device, for carrying out a chemical or physicochemical reaction on a product, comprising a) a microwave generator (10) for generating a single-mode microwaves having a wavelength, b) a reactor (30) having a containment volume, made of microwave-transparent material, for containing the product, c) a microwave application cavity (20) containing said reactor and d) a cover (40) having an outer edge, characterized in that, said application cavity is bounded by (i) a closed side wall (21) approximating a cylinder of revolution about an axis X and (ii) a bottom wall (22), said application cavity is open at the top by an upper opening which provides for fitting and removing the reactor, said bottom wall has an entry port (23) for said single-mode microwaves to enter the application cavity and propagate along said axis X, said application cavity has dimensions which allow for predetermining the resonant frequency of the single-mode microwaves in all planes transverse to the axis X in the application cavity, said cover closes the upper opening of the application cavity in a sealed manner, preventing propagation of the single-mode microwaves outside the application cavity, said cover includes at least one conduit (41) connecting the inside of the application cavity to the outside so that the application cavity can be subjected to atmospheric pressure, for the purpose of operating continuously, the reactor (30) has a bottom including an opening (34) which runs into inlet pipe (35), said inlet pipe inserted into an orifice (24) provided in the bottom wall (22) of the application cavity (20) and emerging outside of said application cavity for connecting to a pump for supplying a product and/or reactant to the reactor, said orifice in the bottom wall of the application cavity is bordered externally by a duct (25) forming a barrier to propagation of microwaves outside of the application cavity, and the at least one conduit in the cover carries outlet pipe (36) connected to the reactor top, for providing connection between the reactor and a pump for removing treated product from the reactor, and for the purpose of carrying out a chemical reaction on a gas continuously, a support shaft (1) is provided which extends along the axis X and has an end immersed in the reactor, said end carrying a sintered support (1b) which extends transversely to the axis X and separates the reactor into an upper reaction chamber and a lower chamber, said lower chamber provided for supplying gaseous products to the upper chamber and communicating via the orifice in the bottom of the reactor with the inlet pipe, said upper reaction chamber provided for reacting a reactant or catalyst (100) in the form of gas, and said upper reaction chamber communicating with the outlet pipe by which treated gases are removed.

* * * * *

UNITED STATES PATENT AND TRADEMARK OFFICE
CERTIFICATE OF CORRECTION

PATENT NO. : 6,120,741
DATED : September 19, 2000
INVENTOR(S) : Patrick JACQUAULT  et al It is certified that error appears in the above-identified patent and that said Letters Patent is hereby corrected as shown below:

On the title page:

[75] Inventors: The third-listed inventor's name is changed to Jean-Louis Di-Martino.

Signed and Sealed this

Fifth Day of June, 2001

*Attest:*

NICHOLAS P. GODICI

*Attesting Officer*

*Acting Director of the United States Patent and Trademark Office*